United States Patent [19] [11] 4,360,993
Tomokazu et al. [45] Nov. 30, 1982

[54] METHOD FOR CONSTRUCTING FLUSH WALL LATHING

[75] Inventors: Otsuki Tomokazu; Osaka Tomikazu, both of Fukui; Otsuka Minoru, Takefu, all of Japan

[73] Assignee: Fukubi Kagaku Kogyo Kabushiki Kaisha, Fukui, Japan

[21] Appl. No.: 134,440

[22] Filed: Mar. 27, 1980

[30] Foreign Application Priority Data

Jan. 18, 1980 [JP] Japan .................... 55-5111

[51] Int. Cl.$^3$ .............................. E04B 2/30
[52] U.S. Cl. ...................... 52/365; 52/378; 52/508; 52/743
[58] Field of Search ............... 52/365, 364, 366, 508, 52/743, 303, 513, 678, 126, 404, 378

[56] References Cited

U.S. PATENT DOCUMENTS

| 1,788,481 | 1/1931 | Brostrom | 52/365 |
| 2,788,552 | 4/1957 | Miles | 52/743 |
| 3,127,703 | 4/1964 | Eshelman | 52/365 |
| 3,771,272 | 11/1973 | Mihaly et al. | 52/366 |
| 4,040,222 | 8/1977 | Cull | 52/365 |
| 4,134,242 | 1/1979 | Musz et al. | 52/743 |
| 4,177,618 | 12/1979 | Felter | 52/743 |

FOREIGN PATENT DOCUMENTS

| 234981 | 8/1964 | Austria | 52/365 |
| 737206 | 6/1966 | Canada | 52/508 |
| 2617758 | 11/1977 | Fed. Rep. of Germany | 52/743 |
| 2034857 | 6/1980 | United Kingdom | 52/743 |

Primary Examiner—J. Karl Bell
Attorney, Agent, or Firm—Holman & Stern

[57] ABSTRACT

A method for constructing a flush uniform wall lathing by providing wallboard fixings at given intervals for adjusting and levelling the wallboard fixing surface of the fixings with a screw, and attaching the wallboard to the wallboard fixings whereby, a lathing having a uniform surface can be easily and efficiently constructed. This method also includes forming a continuous space between a wall and wallboard suitable for injecting and filling insulating material such as foaming plastics or the like.

2 Claims, 12 Drawing Figures

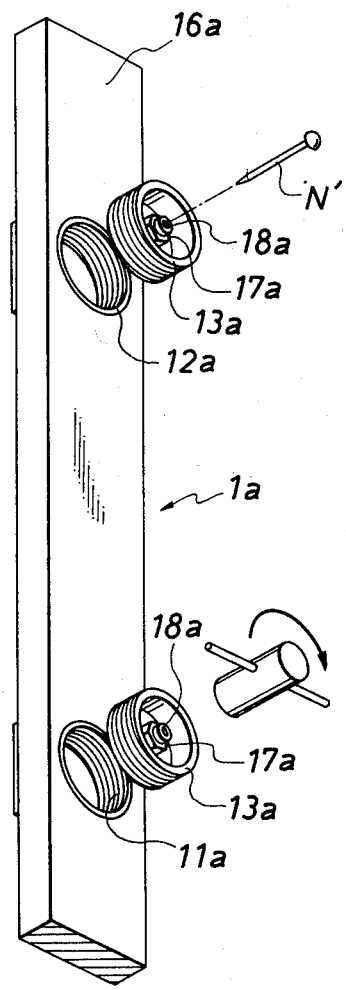
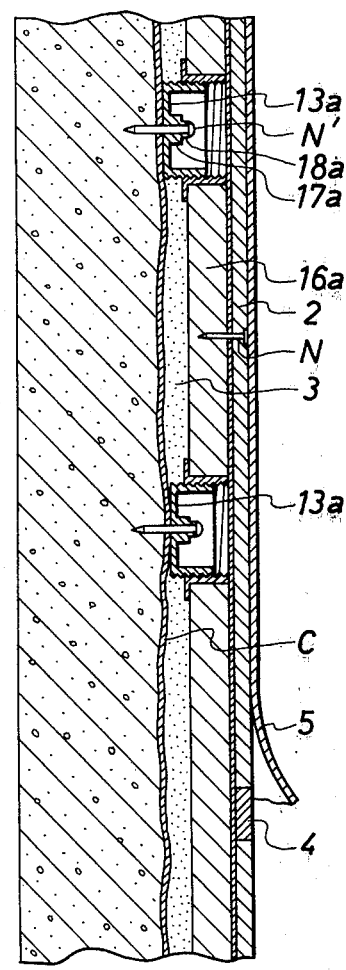

METHOD FOR CONSTRUCTING FLUSH WALL LATHING

BACKGROUND OF THE INVENTION

In constructing walls for buildings and houses of reinforced concrete or of concrete blocks, it is common practice to provide furring strips on the surface of the wall body and a wallboard is placed thereupon to form a lathing. This furring strip method involves considerable skill and time in order to achieve a uniform lathing surface, and when the wall is made of roughly finished concrete with irregular surface, it is necessary to coat the wall with mortar to prepare the flush surface before placing furring strips. When the construction budget does not allow a mortar finish, it is necessary to interpose wooden strips and the like having a suitable thickness between the wall and the furring strips to correct the irregular surface. Unless a certain measure or other is taken to obtain a flush surface, the conventional method is now no longer very appropriate in view of the situation prevailing today in the construction industry which calls for shorter construction terms, simpler work procedures and less cost. Moreover, as the demand for energy saving is having a great impact on the architectural field, a growing number of buildings and houses employ foaming plastics for insulation and for improving their air conditioning efficiency. As for insulation of walls, methods are known to interpose an insulating board made of foaming plastics such as foaming styrol at the time of wallboard lining or to form an insulating layer on the spot after the wallboard is lined by injecting foaming plastics such an foaming uria resin and the like from openings perforated on the wallboard at desired places. The latter method which facilitates injection of insulating material on the spot is more preferred these days as compared with the former method which involves cutting of insulating boards to match the interval of the furring strips and which entails storage of bulky insulating material and transporting the same to the construction spot. Even the latter on-the-spot foaming and filling method can not be considered perfect so long as the lathing is constructed by the conventional furring strip method. In the lathing of the conventional furring strip method, the wall body and the wallboard are continuously connected by flurring strips that are provided vertically and horizontally, so that even if the foaming plastics is filled in the interval between the wall and the wallboard, the insulating layer will not be formed where the furring strips are provided. Also, the insulating material will not be perfectly filled at the junctions of vertical and horizontal furring strips which remain as voids without insulation, whereby the insulation of the wall at such portions becomes imperfect and may cause linear or partial dew condensation which may cause discolorings and soilings of the wall.

SUMMARY OF THE INVENTION

The present invention has been developed in view of the drawbacks mentioned above with regard to the conventional method, and its primary object is to provide a highly efficient and easy method for constructing lathing which has a flush surface.

The second object of the present invention is to provide a novel construction method of lathing which enables formation of an ideal insulating layer by providing a continuous space between the wall body and the wallboard and by injecting insulating material such as foaming plastics so as to provide uniform and continuous insulation.

The third object of the present invention is to provide a novel method for constructing lathing with the use of standardized and mass produced parts and which alleviates the carpenter's work on the spot.

A still further object of the present invention is to provide a novel method which facilitates construction of lathing having a flush surface, even when the wall body is made of roughly finished concrete with much irregularity on the surface, by simply adjusting the level of wallboard fixings and which entails no special treatments or measures to achieve a flat surface.

Still other objects, characteristics and merits of the present invention will become apparent in the following description of the embodiments that are illustrated in the accompanying drawings.

DESCRIPTION OF THE DRAWINGS

In the accompanying drawings,

FIGS. 10 and 11 are cross sectional views of different embodiments according to the present invention; and FIG. 12 is a perspective view of the fixing means of FIG. 11 to show its essential parts.

DETAILED DESCRIPTION

The construction method of the wall lathing according to the present invention comprises, essentially, the steps of providing the wallboard fixing means to the wall for adjusting their level, and attaching the wallboard thereto.

Figure 1:
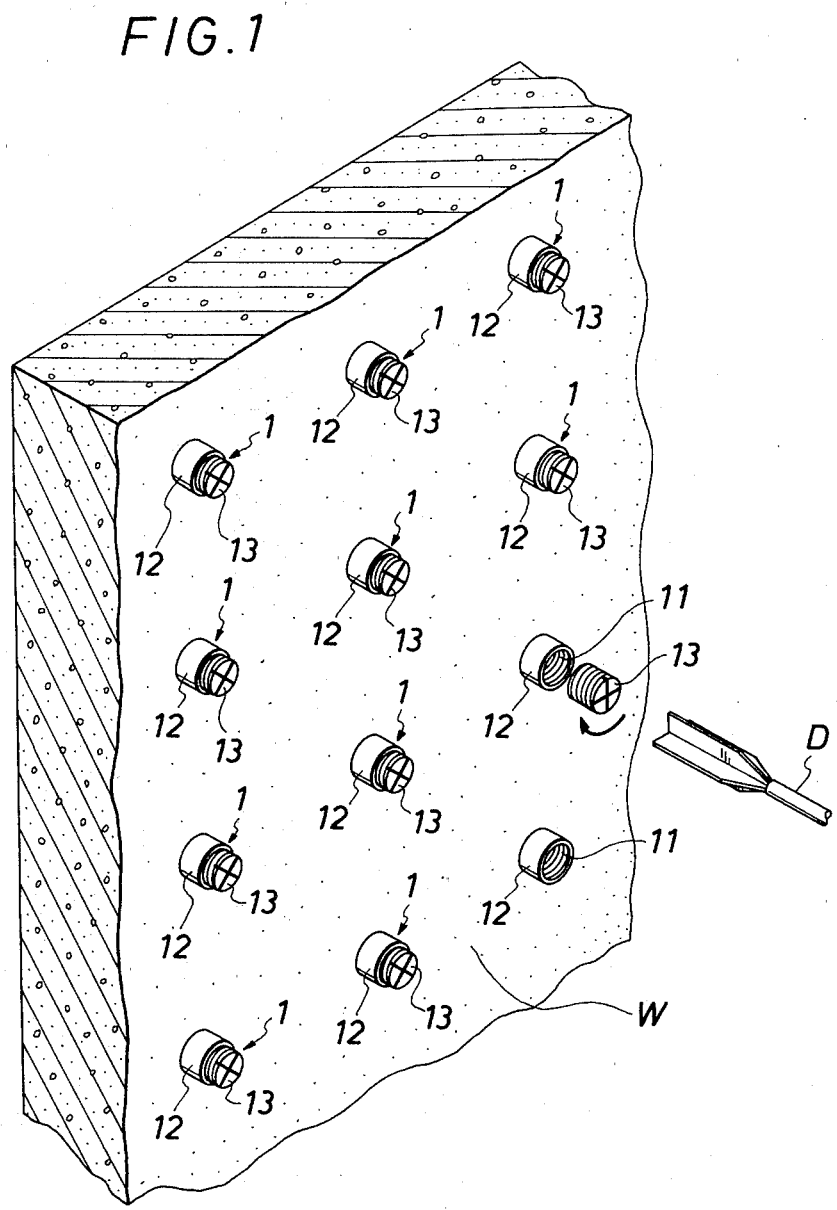
FIG. 1 is a partial perspective view to illustrate the steps of arranging the wallboard flush by means of bolts and nuts to the roughly finished concrete body.
Figure 5:
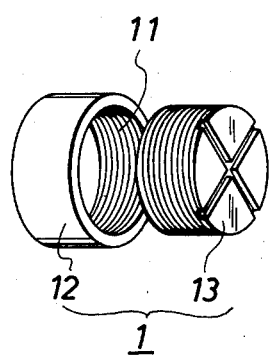
FIGS. 5 through 7 are perspective views showing various structures of the wallboard fixings employed in the present invention.
Figure 6:
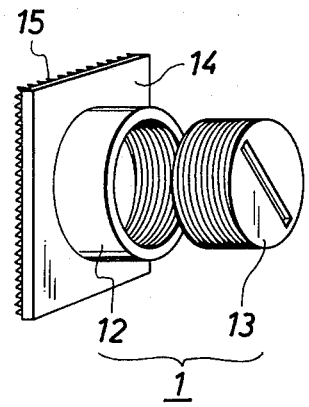
Figure 7:
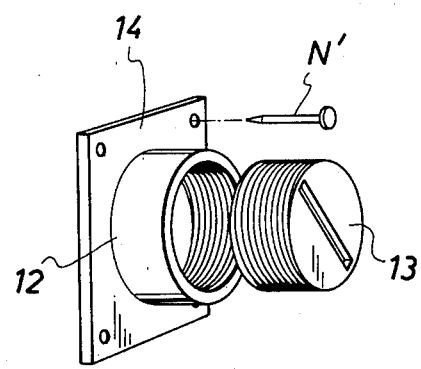

The characteristics of the present invention are best manifested when it is employed in the construction of lathing for a wall body made of roughly finished concrete. FIG. 1 illustrates the wall body W of roughly finished concrete with lots of irregularities on the surface and the plurality of wall board fixing means 1 provided thereon. The fixing means are so arranged as to have a uniform level of fixing by the revolution of the bolts 13. The fixing means (1) such as bolts and nuts which comprises a sleeve (12) on whose inner circumferential surface is cut a groove for female screw (11) and a bolt (13) which engages with the said female screw (11) is usually employed as shown in FIG. 5. The level of wallboard surface can be adjusted by turning bolts (13). The said fixing means is made of hard plastic material which can be nailed. The fixing means (1) can be arranged on the wall body by nailing the sleeve (12) thereon, by using an adhesive agent, or by embedding the sleeves (12) in the concrete wall body in advance. When mailing the sleeve, the fixing means (1) is attached to the wall body (W) by driving nails for concrete from the inside bottom of the sleeve (12) and by screwing a bolt (13) thereto. When an adhesive agent is used, the outside bottom of the sleeve (12) is coated with the adhesive agent, and pressed against the predetermined spot on the wall (W) to securely fix the same and bolt (13) is screwed on. It is preferable to use a fixing means as shown in FIG. 6 which has a fixing board (14) provided integrally at the bottom of the sleeve integrally therewith and which has knurling (15) at the back of the fixing board (14) in view of the better adhesive force. It is also possible to fix the said fixing board (14) with a nail (N), as shown in FIG. 7.

Figure 8:
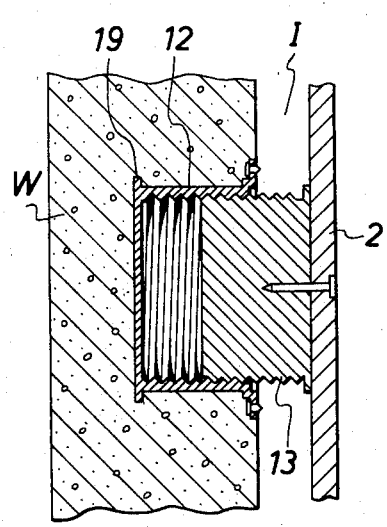
FIG. 8 shows a cross sectional view of an embodiment using another fixing means.
Figure 9:
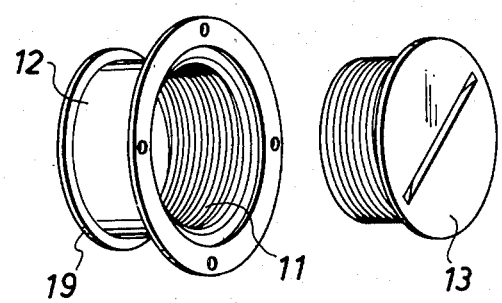
FIG. 9 is a perspective view of the fixing means used in the embodiment shown in FIG. 8.

As shown in FIG. 8, a fixing means (1) of FIG. 9 is preferable when the sleeve (12) is to be embedded in the concrete wall body (W). The flange (19) will be engaged firmly in the concrete wall body to prevent the sleeve from coming off.

The adjustment of the surface level of the wallboard fixing means (1) is conducted with the use of a device such as "plumbbob" known in the art (not shown) so as to level the head of all the bolts (13) which act as the plane where the wallboard is to be fixed, fine adjustment being made with a driver (D) or the like.

Figure 2:
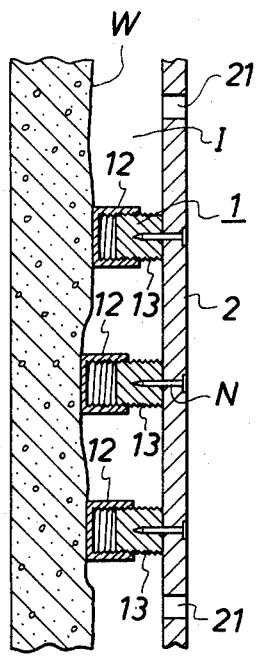
FIG. 2 is a cross sectional view to illustrate the process of forming lathing by fixing the wallboard to the wallboard fixing surface of the fixing means that are arranged to be uniform.

After the wallboard fixing means (1) have been arranged on the wall body (W) and their level of fixing plane adjusted, the wallboard (2) is attached to the fixing means 1. FIG. 2 shows the wallboard (2) at this stage. An arbitrary number of openings (21) may be provided on the wallboard (2) for injecting insulating material such as foaming plastics to construct an insulated wall. The openings (21) for injecting insulating material may be provided in the wallboard (2) in advance or it is possible to bore the holes with a drill after the wallboard has been set up. As for the material of the wallboard, wood, plywood, gypsum board and boards made of rock wool are suitable. The wallboard (2) is set up and fixed to the head of the bolt (13) of the fixing means (1) by a nail (N), thereby forming a space (I) between the wall body (W) and the wallboard (2).

Figure 3:
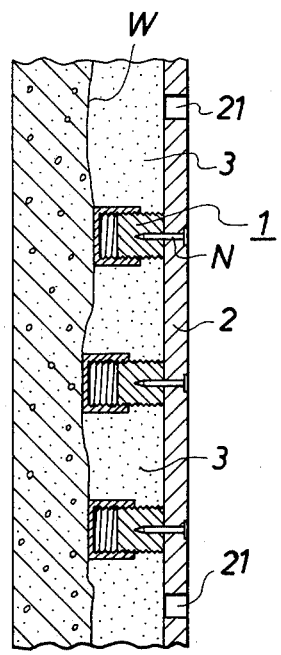
FIG. 3 shows in cross section the filling process of an insulating material such as foaming plastic by injecting and filling the space between the wallboard and the wall body of the lathing.

When foaming plastics or the like is injected at the construction site to fill the space (I) between the wall (W) and the wall board (2) which has thus been constructed as the lathing, to form an insulated wall, foaming plastics or the like is injected through the openings (21) in the wallboard (2), and as shown in FIG. 3, an insulating layer (3) is formed in the space (I). As for the insulating material to be filled in the space (I), it is preferable to use foaming urea resin which imposes no pressure at the time of foaming. As said resin generates no pressure at the time it is injected, it will not cause the wallboard to come off the wall or to warp by the pressure as in the case when foaming urethane resin is used. Moreover, since it has a good fluidity, it will uniformly and thoroughly fill the space (I) and leave no void in the insulating layer (3). Foaming urea resin has a low inflammability and even if it were to catch fire, there would be hardly any toxic gas generated. It is far more advantageous, in view of the construction techniques and safety than any other foaming plastics.

Figure 4:
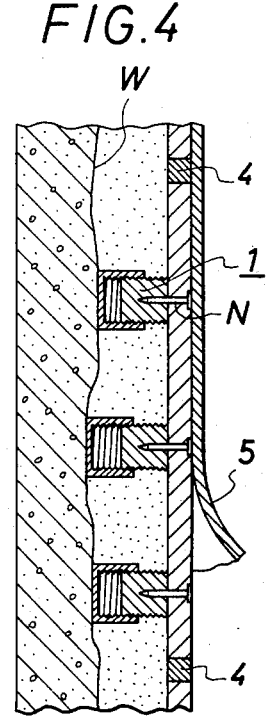
FIG. 4 shows the finishing process in cross-section wherein the injection openings are poured with corking, and a wall finishing material such as cloth and the like is pasted on top.

When the injection of foaming plastics has been completed, the openings (21) of the wallboard (2) are filled with corking (4), and the wallboard is given a finishing treatment as shown in FIG. 4. In the embodiment shown in FIG. 4, the wall is finished by lining the wall with cloth 5. As for the material for corking (4), putty is generally used.

FIG. 5 shows another embodiment of lathing construction according to the present invention. This embodiment is characterized in that the base of the sleeves (12) for the wallboard fixing means (1) is embedded in the concrete wall (W) in advance at a predetermined interval and the bolts (13) are screwed into these sleeves (12) in order to arrange the level of the wallboard fixing plane. It is advantageous, as has been described above, to use a wallboard fixing means (1) which is provided with a flange (19) as shown in FIG. 9.

Figure 10:
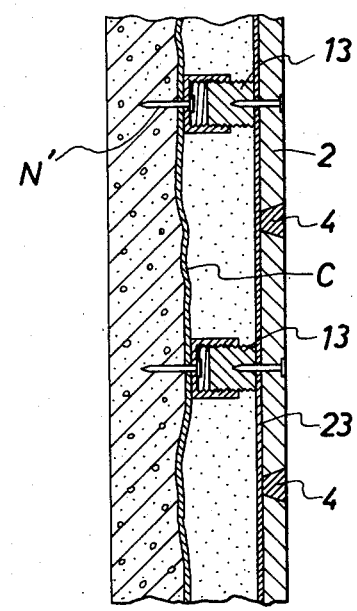

FIG. 10 shows still another embodiment in accordance with the present invention. The most characteristic feature of this embodiment lies in that the wallboard whose back is provided with waterproof treatment (23) is used. By employing such a method, various inconveniences deriving from drying and shrinkage of the wallboard, especially rapid drying which occurs when foaming urea is used, can be prevented, thereby effectively preventing cracks in the insulating layer (3).

FIGS. 11 and 12 show still another embodiment of the present invention. The outstanding feature of this embodiment is that the wallboard fixing means (1a) has a base strip (16a) as shown in FIG. 12. In the figures, (11a) denotes female screws, (12a) sleeves, (13a) bolts, (17a) hexagon head for screwing, and (18a) pipe members for inserting nails. According to this embodiment, a tubular sleeve (12a) having a male screw is attached to a long base strip (16), and if the wallboard (2) is nailed with nails (N) fixed to the base strip, a nailing area equal to the area of the base strip becomes possible, allowing a much greater number of positions.

It is evident that a nailing operation using the nail (N) for the wallboard (2) becomes extremely easy as compared to the operation where the worker has to probe without actually seeing the head of the bolts across the wall board (2), the area of the said head being quite small as shown in the embodiment of FIGS. 10 and 11. What is more, a continuous space between the wall body and the wallboard (2) will prevent the occurence of disruption in the insulating layer.

Having described my invention, what I claim as new and desire to secure by Letters Patent is:

1. A method for constructing flush insulated wall lathing on a surface of a concrete wall body comprising the steps of providing a plurality of plastic sleeve members each closed at one end and having an internal screw thread, a radial flange at said closed end and a cooperating threaded bolt having a flat outer end engaging said screw thread, attaching said plastic sleeve members at predetermined spaced intervals to said wall body by fastening said closed end to said wall body so that the central axes of said sleeve members are substantially parallel by embedding at least said flange in said wall body when the concrete thereof is formed so that said flange positively retains each sleeve member in said wall body, inserting said threaded bolts into said sleeve members and adjusting them so that said flat outer ends are substantially co-planar, supporting a wallboard against said flat outer ends of said bolts, to provide a space between said wallboard and said wall body, fastening said wallboard in position by nailing it to said flat outer ends of said bolts, drilling a plurality of holes through said wallboard between said sleeves and bolts, injecting foaming plastic insulating material of low in situ foaming pressure into said space between said wall body and wallboard through said holes to substantially completely fill said space, and plugging said holes.

2. The method as claimed in claim 1 wherein said foaming plastic insulating material is a foaming urea resin.

* * * * *